United States Patent [19]
Adair

[11] 3,835,372
[45] Sept. 10, 1974

[54] SWITCH CLOSURE DEVICE FOR METERS

[75] Inventor: John D. Adair, Huntington Valley, Pa.

[73] Assignee: The Singer Company, New York, N.Y.

[22] Filed: May 14, 1973

[21] Appl. No.: 360,247

[52] U.S. Cl............... 324/28 R, 200/153, 307/106, 324/157, 340/203
[51] Int. Cl.... G01n 31/02, H03k 3/00, G08c 19/16
[58] Field of Search............ 324/157, 153; 340/203; 200/153, 156; 335/205; 307/132, 106; 73/194 E

[56] References Cited
UNITED STATES PATENTS

| | | | |
|---|---|---|---|
| 3,576,555 | 4/1971 | Struck | 340/203 |
| 3,641,537 | 2/1972 | Hoffman | 340/203 |
| 3,686,507 | 8/1972 | Krutz et al. | 307/106 |

*Primary Examiner*—Alfred E. Smith
*Attorney, Agent, or Firm*—Marshall J. Breen; Chester A. Williams, Jr.; Harold Weinstein

[57] ABSTRACT

A switch closure device mounted on an index box in which the motion of an index arm turns a wheel which in turn causes a magnet to activate a reed switch. The components of the switch closure device adjacent to the index are made of clear polycarbonate plastic so as not to obscure the reading of the index. The wheel and magnet assembly are mounted internally of the index box, while the reed switch and the terminal block are mounted externally thereof. Safety of operation is assured since the switch is separated from the fluid in the meter by three seals: the stuffing box, the index box and the glass which encapsulates the reed switch. The switch closure device can provide any one of a number of pulses per unit volume, as for example, every 10, 100 or 1,000 cubic feet of metered gas.

3 Claims, 9 Drawing Figures

PATENTED SEP 10 1974 3,835,372
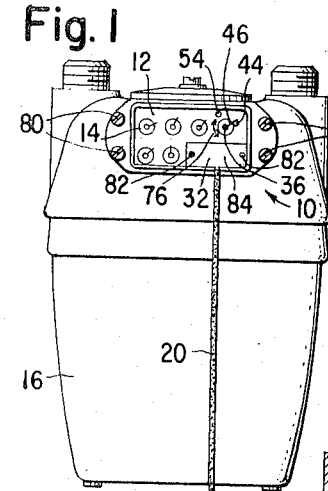
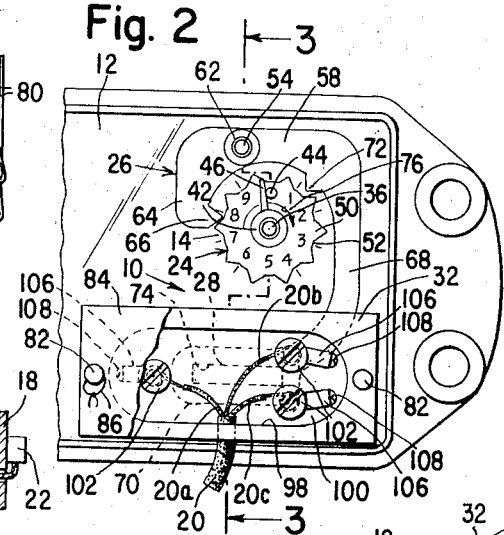
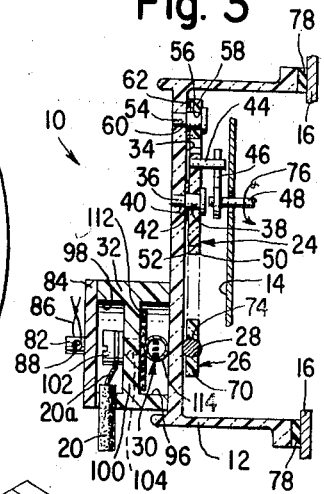
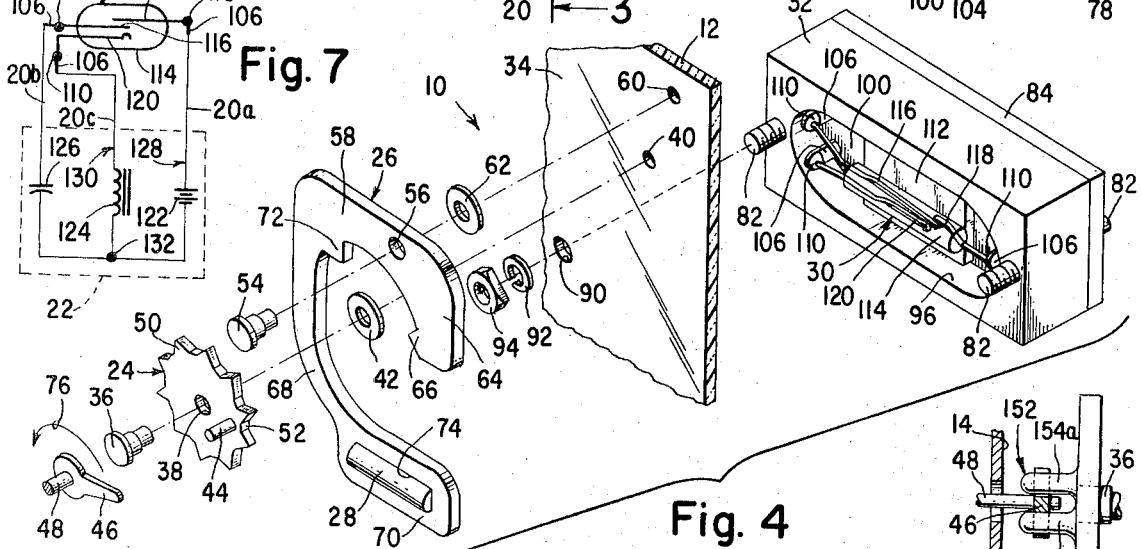
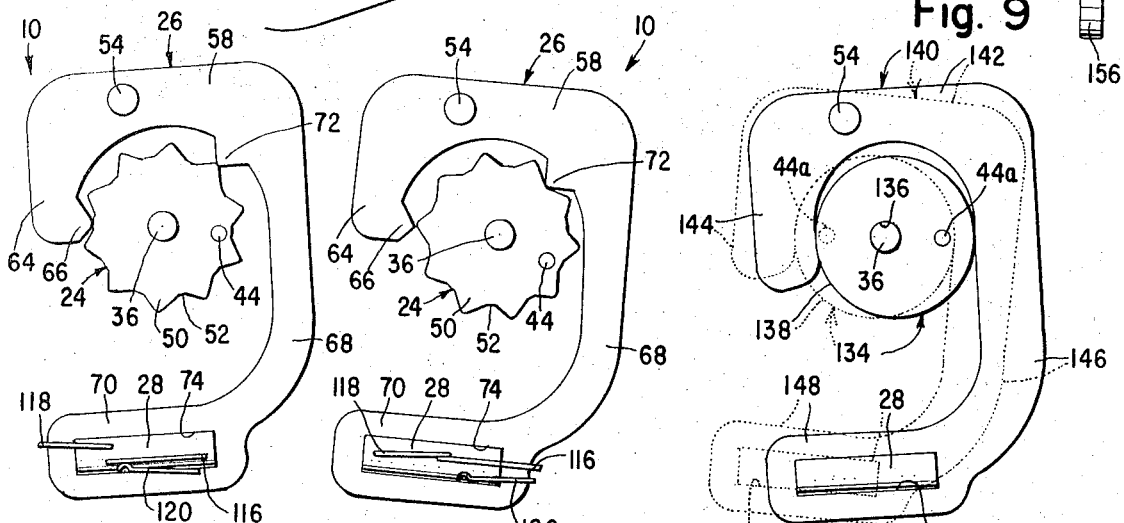

SWITCH CLOSURE DEVICE FOR METERS

BACKGROUND OF THE INVENTION

Heretofore, prior art switch closure devices could not be tested separately from the meter to which they were attached. Also, the construction of the prior art switch closure devices was such as to obscure or cover the index of the meter so as to prevent its readings without great difficulty, if at all.

SUMMARY OF THE INVENTION

It is an object of the present invention to provide an improved switch closure device for meters which overcome the prior art disadvantages; which is simple, economical and reliable; which is mounted on the index box; which is separately testable by mounting the index box at a suitable test site; which has its components made of a clear transparent plastic such as polycarbonate so as not to prevent reading of the meter index; which is activated by the meter to turn a wheel which causes a magnet to actuate a reed switch; and which has a wheel causing a predetermined number of magnetic passes per revolution of the index hand.

Other objects and advantages will be apparent from the following description of several embodiments of the invention and the novel features will be particularly pointed out hereinafter in the claims.

BRIEF DESCRIPTION OF THE DRAWINGS

This invention is illustrated in the accompanying drawings in which:

FIG. 1 is an front elevational view of a meter having an index box embodying the present invention;

FIG. 2 is an enlarged fragmented view of the index box showing the externally mounted terminal and internally mounted drive assembly;

FIG. 3 is a side elevational view taken along line 3—3 of FIG. 2;

FIG. 4 is an exploded perspective view of the switch closure device of the present invention;

FIG. 5 is a diagrammatic representation of the drive assembly and magnet in its rightmost position of travel to open the reed switch;

FIG. 6 is a diagrammatic representation of the drive assembly and magnet in its leftmost position of travel to close the reed switch;

FIG. 7 is a circuit diagram including the reed switch of the switch closure device of the present invention;

FIG. 8 is another embodiment of the drive assembly and magnet of the present invention;

FIG. 9 is the modified embodiment of a driven wheel of the drive assembly of the present invention.

DESCRIPTION OF THE INVENTION

In the embodiment of the invention illustrated in FIGS. 1 through 7 the novel switch closure device 10 is adapted to be connected to the index box 12 which enclosures an index or register 14 of a meter 16. In the preferred embodiment the meter 16 is a gas meter and will be conventionally located in the interior of a building having a wall 18. The switch closure device 10 is connected by a three-wire lead 20 having lines 20a, 20b and 20c therein, to a remote pulse counter unit or remote register 22 mounted on the exterior of the building wall 18.

The switch closure device 10, illustrated in FIGS. 2, 3 and 4, includes a wheel 24, an arm 26 and a magnet 28 disposed on the inside of the index box 12, and a reed switch 30 and a terminal block 32 disposed on the exterior of the index box 12.

The wheel 24 is pivotally mounted to the face 34 of the index box 12 by a shoulder pin 36 passing through a central aperture 38 of the wheel 24 to be staked within a smaller aperture 40 formed in the face 34, with a washer 42 sandwiched between the wheel 24 and the face 34 as shown in FIG. 4. The drive pin 44 is affixed to the side of the wheel 24 facing the index 14 to extend in a horizontal plane and terminate prior to touching the index 14, but pin 44 is of sufficient length to cross over an index hand 46 carried on the end of an index shaft 48. In the preferred embodiment the switch closure device 10 will be activated by the register of the index 14 at the rightmost end as shown in FIG. 1 corresponding to the smallest unit measurement, but it will be understood that it is within the scope of the present invention to use any one of the register of the index 14 by merely mounting the switch closure device in superposition to the register and redesignating the volume at the counter. In the preferred embodiment the wheel 24 will have ten equally spaced circumferencially formed teeth 50 between which are formed a like number of recesses 52.

The arm 26 is mounted in the same plane as that of the wheel 24 by a shoulder pin 54 passing through an aperture 56 formed in the top anchor lever 58 of the arm 26 to be staked into an aperture 60 formed in the face 34 above the aperture 40, with a washer 62 sandwiched between the arm 26 and the face 34.

The anchor lever 58 lies in a substantially horizontal plane and has the aperture 56 formed on one side of the center thereof, with a downwardly extending short portion 64 formed on the side of lever 58 adjacent the aperture 56 and terminating in a forwardly extending pallet 66. A long projection 68 extends from the opposite side of lever 58 downwardly to terminate in a horizontally extending magnet lever 70 disposed parallel to lever 58 and substantially centered under the aperture 56. A pallet 72 extends inwardly from the junction point of lever 58 and projection 68 at a location above pallet 66 and on the opposite side of lever 58 therefrom. The magnet lever 70 has a slot 74 into which magnet 28 is affixed.

The pallets 66 and 72 are so formed that when one is engaging a tooth 50 the other will be disposed within a recess 52, as is illustrated in FIGS. 5 and 6. When the meter 16 is operative the index hand 46 will rotate in the direction represented by the arrow 76 shown in FIGS. 1, 3 and 4. Rotation of the index hand 46 will cause a like rotation of a wheel 24 due to the hand 46 engaging the pin 44 to rotate the wheel 24 about the axis of pin 36. The pallets 66 and 72 alternately engage the teeth 50 and the recesses 52 to produce an escapement movement of the arm 26 whereby the arm 26 will be pivoted about the axis of pin 54 to produce a reciprocal movement of the magnet 28 adjacent the reed switch 30. The arm 26 and the attached magnet 28 has a rightwardly extended position of motion illustrated in FIG. 5, wherein the magnet 28 is at its rightmost point with the pallet 66 engaging one of the recesses 52 and the pallet 72 engaging the tip of one of the teeth 50. The other extreme of travel for the arm 26 and connected magnet 28 is illustrated in FIG. 6 wherein the magnet 28 and arm 26 assume a leftmost position of travel wherein the pallet 66 will engage the tip of one of the teeth 50 and the pallet 72 will engage one of the recesses 52. The escapement drive is conventional in that the sides of the teeth 50 will produce a camming action which alternately drives and locks the pallets 66 and 72 to produce the reciprocal motion of the arm 26 and magnet 28.

The wheel 24 and the arm 26 are mounted internally within the index box 12 adjacent to the face 34 and are substantially flat members adapted to rarely fit within the dimensions of existing index boxes with the only modification necessary being that of providing apertures 40 and 60 which are substantially sealed by the pins 36 and 54, respectively, being staked therein. The wheel 24 and the arm 26 are made of a clear plastic such as polycarbonate so as not to interfere with the reading of the index 14 which the wheel 24 and arm 26 are placed in superposition to. Though plastic could be used for the connecting parts of the wheel 24 and arm 26 in the preferred embodiment the pins 36, 44 and 54 were made of metal. No interference with the reading of the index 14 is experienced from the pin 36 since its axis is substantially coincident to the axis of shaft 48. The pin 54 is located sufficiently above the pin 36 so as to be above and removed from the index 14 as shown in FIG. 1. This leaves the drive pin 44 which is of a uniform diameter and its proximity to the hand will not interfere with normal reading in that it only partially covers a single numeral of the register of index 14, at any one point in time. The index box 12 will also be made of a clear plastic such as polycarbonate. The index box 12 will be sealingly connected to the meter 16 by a resilient gasket 78 as illustrated in FIG. 3, and the index box 12 will be affixed to the meter 16 by a plurality of screws 80.

The terminal block 32 is box shaped with a rectangular face and a connecting pin 82 extending therethrough on either side thereof. The front face is enclosed by a cover 84 received on the forwardly extending portion of the pins 82 to be held in place by tie rod 86 passing through an aperture 88 formed in the pins 82 outwardly of the cover 84. The inwardly extending end of the pins 82 is threaded to pass through apertures 90 formed in the face 34 of the index box 12 to be connected thereto by a lock washer 92 and a nut 94 threadedly connected on the pins 82 as illustrated in FIGS. 2, 3 and 4. The mounting block 32 will be connected to the index box 12 as illustrated in FIG. 1 at the lower righthand corner thereof so as to be removed from interference with reading of the index 14. Terminal block 32 is made of opaque material. The terminal block 32 has a recess 96 from its inner face, and a recess 98 from its outer face to define a central mounting plate 100 therebetween. Screws 102 are disposed into recess 98 and threadedly received in tapped holes 104. The screws 102 serve to mount terminals 106 opposite ends of which extend through apertures 108 formed in the mounting plate 100 to project into the recess 96 and provide for electrical connection with the leads from the reed switch 30 as at the soldered connections 110 depicted in FIG. 4. Connections 110 also serve to mechanically mount the reed switch 30 in the recess 96.

A resilient mounting cushion 112 is affixed to the underside of mounting plate 100 to act as a cushion and spacer for the reed switch 30 so as to position the reed switch 30 immediately adjacent the exterior of face 34 upon mounting the terminal block 32 to the index box 12 as is illustrated in FIG. 3.

The reed switch 30 is encased in a glass envelope 114, and may be termed a single pole double throw type switch. The reed switch 30 has three leads or elements which comprise a pole piece 116 disposed intermediate an upper lead 118 and a lower lead 120. The pole piece 116 is flexible and will be alternately biased into contact with first one and then the other of the upper lead 118 and the lower lead 120, respectively, as is illustrated in FIGS. 5 and 6; wherein FIG. 5 shows the pole piece 116 in electrical contact with the lower lead 120, and FIG. 6 shows the pole piece 116 in electrical contact with the upper lead 118. The cause of the change in position of the pole piece 116 is the magnet 28 which shifts position to draw the pole piece either upwardly or downwardly. As is common with reed switches, certain of the componets are flexible and others are rigid so that in the present instance the pole piece 116 is flexible while the upper lead 118 and the lower lead 120 are rigid. Of course, the portion of the pole piece which extends outwardly from envelope 114 is rigid.

Located in the remote counter unit 22 and represented diagrammatically in FIG. 7 is a battery 122, a pulse counter 124 and a capacitor 126. The reed switch 30 and the pulse counter unit 22 are electrically connected by means of the three-wire lead 20 having wires 20a, 20b and 20c. Two circuits are formed between the reed switch 30 and the pulse counter unit 22, namely a charging circuit 128 and a firing circuit 130.

The charging circuit 128 will electrically connect the capacitor 126 to the battery 122 to charge the capacitor 126 by the pole piece 116 contacting the upper lead 118 so as to electrically connect line 20a which includes battery 122 with line 20b which includes capacitor 126 at a junction point 132. Since line 20a is connected to upper lead 118 and line 20b is electrically connected to pole piece 116 the fact that pole piece is biased into contact with the upper lead 118 will complete the charging circuit 128.

The firing circuit 130 includes the charge capacitor 126 and electrically connects the same to the counter 124 whereby the capacitor 126 is fired or discharged to send a pulse to the counter 124 to obtain a unit count. The firing circuit 130 is made by the pole piece 116 being biased into contact with the lower lead 120 to electrically connect lines 20b and 20c. Line 20b includes the capacitor 126, while line 20c includes the counter 124. Lines 20b and 20c are electrically connected at the junction point 132, and line 20b is connected to the pole piece 116 which will be biased into contact with the lower lead 120, which rod is connected to the line 20c to complete the firing circuit 130.

Accordingly, FIG. 6 represents the position of the switch closure device 10 during which time the magnet 28 has biased the pole piece 116 into contact with the upper rod 118 to complete the charging circuit 128, the purpose of which is to place the capacitor 126 in circuit with the battery 122 to charge the capacitor 126. Thereafter the reciprocal motion of the arm 26 will cause the magnet 28 to assume the position shown in FIG. 5 which switches the pole piece 116 and places it into contact with the lower rod 120 to complete the firing circuit 130 whereby the firing or discharge of the capacitor 126 sends a pulse to the counter 124 to activate the same and obtain a unit count. The pulses at the counter 124 are produced in synchronization to the rotation of the index hand 46 so that a predetermined unit measurement will be obtained at the remote counter unit 22, corresponding to that of the count reflected at the index 14. This unit measure conveniently will be for every 10, 100 or 1,000 cubic feet of measured gas responsive to the number of counts generated per revolution of the index hand 46, and also the measurement reflects the identical quantity registered at the index 14.

When it is desired to produce a single pulse at the counter unit 22 responsive to a single revolution of the index hand 46 the switch closure device 10 will be modified by the use of a wheel 134 having an eccentrically disposed aperture 136 through which the pin 36 passes to rotatably mount the wheel 134 to the face 34 of the index box 12. The wheel 134 has a circular circumference 138 which has a drive pin 44a affixed thereto to be contacted by the index hand 46 to cause the wheel 134 to eccentrically rotate about the axis of the pin 36. Of course, the wheel 134 is used in place of the wheel 24.

Another replacement is that of the use of arm 140 for the arm 26. The arm 140 has a pivot connection by means of the pin 54 and the anchor lever 142 which extends into a downwardly turned projection 144 on the side thereof adjacent the pin 54, and on the opposite side a downwardly extending projection 146 which terminates in a magnetic lever 148 which is slotted as at 150 to carry the magnet 28.

Rotation of the eccentric wheel 134 will produce a reciprocal motion in the arm 140 to wave the magnet 28 reciprocally pass the reed switch 30 in a manner similar to that described hereinbefore. The two extremes of travel of the magnet 28, the wheel 134 and the arm 140 are represented in FIG. 8 with the rightmost motion shown in the solid line and the leftmost motion shown in the dotted line.

The solid line representation of FIG. 8 corresponds to the representation of FIG. 5 wherein the reed switch 30 will have the pole piece 116 contacting the lower lead 120 to electrically contact the firing circuit 130. The dotted line representation of FIG. 8 correspond to that shown in FIG. 6 wherein the reed switch 30 has the pole piece biased into electrical contact with the upper lead 118 to activate the charging circuit 128. Each rotation of the index hand 46 will produce a single rotation of the eccentric wheel 134 to generate a single pulse and a corresponding single count at the pulse counter unit 22. It will be understood that the number of pulses generated responsive to each rotation of the index hand 46 may be selectably controlled by the number of reciprocal movements of the magnet 28 past the reed switch 30. Furthermore, other types of switches than the reed switch 30 could readily be used and connected in circuit with other types of conventional pulse counter units than unit 22 as to produce the desired results while obtaining the same benefits of the presently disclosed novel switch closure device 10.

The modified drive pin 152 is shown in FIG. 9 wherein a double pin 154a and 154b is formed integrally with the wheel 156 which may be of any type such as that of wheel 24, or wheel 134, or any other suitable design long as the same is connected by a pin 36 for rotation by an index hand 46. The index hand 46 will be placed between the pins 154a and 154b so as to entrap the same and prevent any accidental disengagement therebetween while the index hand 46 is driving the wheel 156.

It will be understood that various changes in the details, materials, arrangements of parts and operating conditions which have herein described and illustrated in order to explain the nature of the invention may be made by those skilled in the art within the principles and scope of the invention.

Having set forth the nature of the invention, what is claimed herein is:

1. An operative switch closure device connectable to a meter or to a tester, and operative responsive the rotation of the meter or test index hand means, said switch closure device comprising:
   a. an index box detachably connected to either the meter or the tester, and disposed over the index hand means,
   b. the index box having a wall defining an internal side and an external side,
   c. a terminal box is affixed to the external side of the index box,
   d. a reed switch is mounted on the external side of the wall of the terminal box adjacent the internal side thereof,
   e. a wheel rotatively mounted on the internal side of the wall of the index box in super position to the index hand means,
   f. a pin means projecting from the wheel across the path of travel of the index hand means whereby rotation of the index hand will result in rotation of the wheel,
   g. an arm pivotally connected at one end thereof to the internal side of the wall of the index box, and in contact with and driven by the wheel,
   h. a magnet carried on the other end of the driven arm to transcribe a path across the reed switch to actuate the same in a predetermined sequence with respect to the rotation of the index hand means, and
   i. terminal means carried in the terminal box are electrically connected through the terminal box in circuit with the reed switch, and adapted to be connected to place said switch closure device in circuit for operation.

2. The combination claimed in claim 1 wherein:
   a. the wheel is eccentricly mounted with a circular circumference,
   b. the arm horizontally contacts the wheel at diametrically opposite points to be driven thereby in a predetermined ratio to move the magnet across the reed switch in a selective number of passes per revolution of the index hand.

3. The combination claimed in claim 1 wherein:
   a. the pin is formed integrally on the wheel in a pair, one on either side of the index hand to entrap the hand between the pins for positive connection therebetween.

* * * * *